No. 703,663. Patented July 1, 1902.
R. W. NEWTON.
AUTOMATIC FIRE EXTINGUISHER.
(Application filed Apr. 25, 1892.)
(No Model.) 2 Sheets—Sheet 1.

WITNESSES:
Chas. H. Luther Jr.
Henry J. Miller

INVENTOR:
Robert W. Newton
by Joseph A. Miller & Co.
Attys

THE NORRIS PETERS CO., PHOTO-LITHO., WASHINGTON, D. C.

No. 703,663. Patented July 1, 1902.
R. W. NEWTON.
AUTOMATIC FIRE EXTINGUISHER.
(Application filed Apr. 25, 1892.)
(No Model.) 2 Sheets—Sheet 2.

WITNESSES:
Chas. H. Luther Jr.
Henry J. Miller

INVENTOR:
Robert W. Newton
by Joseph A. Miller & Co.
Attys

THE NORRIS PETERS CO., PHOTO-LITHO., WASHINGTON, D. C.

UNITED STATES PATENT OFFICE.

ROBERT W. NEWTON, OF PROVIDENCE, RHODE ISLAND.

AUTOMATIC FIRE-EXTINGUISHER.

SPECIFICATION forming part of Letters Patent No. 703,663, dated July 1, 1902.

Application filed April 25, 1892. Serial No. 430,493. (No model.)

*To all whom it may concern:*

Be it known that I, ROBERT W. NEWTON, of Providence, in the county of Providence and State of Rhode Island, have invented a new and useful Improvement in Automatic Fire-Extinguishers; and I hereby declare that the following is a full, clear, and exact description of the same, reference being had to the accompanying drawings, forming part of this specification.

This invention has reference to improvements in the construction of automatic fire-extinguishers adapted to be released by the action of heat and to distribute water in the form of spray over a large area; and it consists in the peculiar and novel construction more fully set forth hereinafter and particularly pointed out in the claims.

The object of the invention is to hold the valve rigidly to the valve-seat against all possible pressure and against the action of the water-hammer.

Another object of the invention is to continue to hold the valve firmly against the valve-seat while the device by which the valve is held is being acted on by the heat and released.

Another object of the invention is to protect the valve-face against corrosion and prevent the sticking of the valve on the valve-seat.

Another object of the invention is to improve the distribution of the water; and another object of the invention is to strengthen the solder-joint and secure its complete rupture when subjected to heat.

Figure 1:
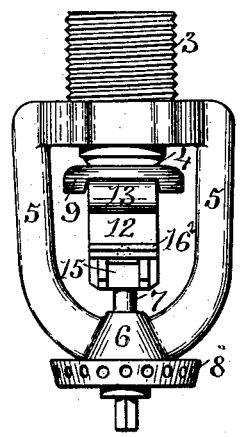
Figure 2:
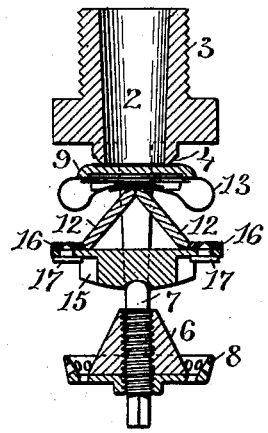
Figure 3:
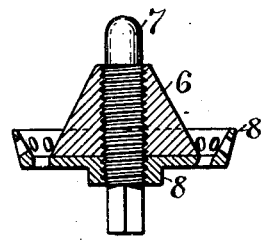
Figure 4:
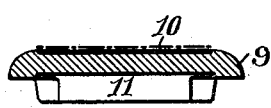
Figure 5:
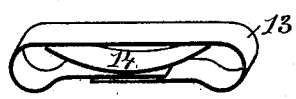
Figure 6:
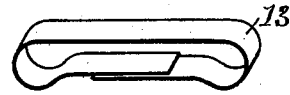
Figure 7:
Figure 8:
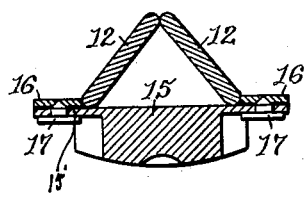
Figure 9:
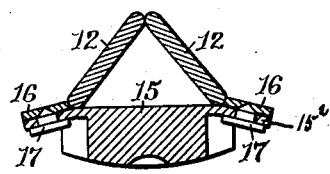
Figure 10:
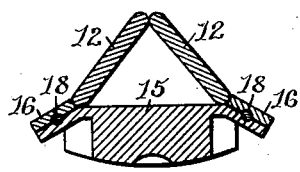
Figure 11:
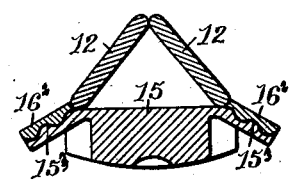
Figure 12:
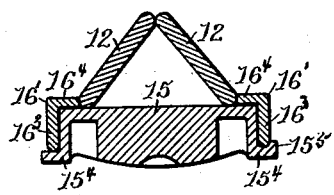
Figure 13:
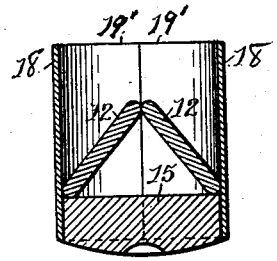
Figure 14:
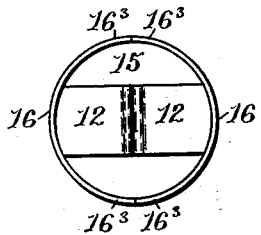

Figure 1 is a vertical side view of the improved automatic fire-extinguisher. Fig. 2 is a vertical sectional view of the same. Fig. 3 is an enlarged sectional view of the distributor, showing the abutment-screw and the deflector adapted to form a lock-nut. Fig. 4 is an enlarged sectional view of the valve. Fig. 5 is a perspective view of a compound spring; Fig. 6, a perspective view of the overlapping portion of the compound spring, and Fig. 7 a perspective view of the curved spring. Figs. 8 and 9 are sectional views of the thrust-blocks, showing the solder-joint strengthened by means of conical pins. Fig. 10 is a sectional view of a thrust-block in which the solder-joint is strengthened by means of cylindrical rods inserted in the joint. Fig. 11 is a sectional view of a thrust-block in which the solder-joint is strengthened by corrugating the adjoining faces. Fig. 12 is a sectional view of a thrust-block provided with angular thrust-plates. Fig. 13 is a sectional view of a thrust-block provided with semicylindrical thrust-plates. Fig. 14 is a plan view of the thrust-block shown in Fig. 13.

Similar numbers of reference designate corresponding parts throughout.

In the drawings, 2 indicates the nozzle of the automatic fire-extinguisher. It is provided with the screw-thread 3, the annular valve-seat 4, and the yoke 5, the arms of which terminate in the truncated cone 6, through which the screw-threaded thrust-pin 7 extends vertically. The deflector 8, as well as the cone 6, is screw-threaded to correspond with the screw-thread on the thrust-pin 7, so that when the thrust-pin has been adjusted the deflector is screwed up hard against the bottom of the cone 6 to firmly lock the thrust-pin in this position. The deflector 8 is provided with an outwardly-flaring perforated rim, and the annular space between the base of the cone 6 and the outwardly-flaring inner surface of the rim is perforated. The holes in the deflector vary in their direction, so as to distribute the water more evenly in all directions, around as well as under the deflector. By this peculiar construction the stream of water discharged from the nozzle strikes the rounded end of the thrust-pin 7 and the sides of the cone 6. A large part of the inner portion of the stream is thus deflected outward and broken into spray, while the outer portion of the stream striking the lower part of the cone is partly deflected against the inner flaring surface of the rim of the deflector 8 and directed upward to the ceiling, while a portion of the water passes through the perforations of the deflector 8. By flaring the inner surface of the raised rim of the deflector a greater or lesser portion of the ceiling will be covered by the deflected water of the discharging stream.

The nozzle is closed by means of the valve-disk 9, the upper face of which is provided with a circular recess, into which the disk 10 is secured. This disk 10 is made of what is known in the jewelers' art as "rolled plate"—that is to say, an ingot of inferior metal, usually brass or copper, is plated with precious metal and is then rolled out into a thin sheet, one side of which is covered with a thin film of precious metal. In the disks I use rolled-gold plate is preferable, but silver, platinum, or other more or less precious metals or alloys of metals may be used. As the precious metal is always more ductile than the inferior metal, the plated disk makes a perfectly water-tight joint when the valve is forced against the valve-seat, and as the precious metal is not corroded by the air or the water the valve cannot stick. The lower part of the valve 9 is provided on opposite sides with the projections 11, between which a spring is placed on which the thrust-arms 12 bear. The spring may be the simple curved spring shown in Fig. 7, the overlapping spring shown in Fig. 6, or the compound spring shown in Fig. 5. The essential quality of the spring is that its resiliency is greater than the pressure of the water in the spinkler system, so that during the release of the thrust-arms 12 the spring will follow the same until they are entirely released and hold the valve tightly to its seat to prevent the leaking of the valve until the valve is entirely released, and another quality essential in the spring is that the same must be sufficiently flexible to lie flat, metal to metal, between the thrust-arms 12 and the valve 9, so that the valve is held by a fixed unyielding dead pressure to its seat in the normal condition. I prefer to construct the spring, as shown in Fig. 5, of the bent overlapping spring 13, with the curved spring 14 inserted as shown in that figure.

In such an automatic fire-extinguisher with a valve held against its seat by a positive dead thrust sufficient to resist any abnormal pressure or water-hammer great strain is exerted on the soldered joint or joints. It is therefore essential to strengthen the same when in their normal condition and also important to break or rupture the solder-joint as soon as the same is weakened by the heat of a fire. To this end I have devised a number of different devices, all designed to strengthen the solder-joint when in the normal cooled condition and assist in rupturing and breaking the solder-joint when weakened by heat.

In Figs. 2, 8, and 9 the thrust-arms 12 rest on the thrust-block 15 and bear against the thrust-plates 16, which are soldered to the thrust-block, and the joint is strengthened by the pins 17, inserted through holes in the thrust-block, so that the conical pointed ends enter conical recesses in the thrust-plates 16. The pins 17 may be permanently fixed, or they may be inserted and secured by solder. They resist any yielding of the plates on the line of the solder-surfaces until the joint is broken, so that the plates may rise over the conical points of the pins. The solder-joint may be on a horizontal plane, as is shown in Figs. 2 and 8, or on inclined planes, as shown in Fig. 9.

The modification shown in Fig. 10 consists in strengthening the solder joint by the insertion of a rod or wire. To this end the surfaces of the thrust-block 15 and the thrust-plates 16 to be secured together by solder are grooved, so as to receive the rod or wire 18, which is inserted and the whole soldered together, so that the thrust-plates cannot move or slide on the thrust-block until the solder-joint is broken. Two rods may be used, if desired, on each thrust-plate. In this modification (shown in Fig. 11) the upper surfaces of the portions $15^3$ of the thrust-block 15 are corrugated, and the lower surfaces of the thrust-plates $16^2$ are correspondingly corrugated to practically produce the same result as the rod 18. (Shown in Fig. 10.) In Fig. 12 the thrust-plates 16' are L-shaped, the portion $16^3$ being at right angle to the portion $16^4$, and they are soldered, respectively, to the top and the end of the thrust-block 15, so that when the solder is heated the thrust of the thrust-arms 12 will slide the thrust-plate outward, but not until the solder-joint by which the portion $16^4$ is secured to the end of the thrust-block is ruptured. By holding the foot of the thrust-plate 16' by means of the lip $15^5$, as is shown on the right-hand of Fig. 12, the L-shaped thrust-plate will not move until the whole of the solder-joint is ruptured. The modification shown in Figs. 13 and 14 shows a thrust-block of circular form inclosed by two semicylindrical thrust-plates 19, soldered to the periphery of the thrust-block. By this arrangement the thrust-arms 12 bear each against half of the cylinder. The solder-joint is of considerable area, and when subjected to heat the central portion is subjected to a tearing strain at right angles to the joint, which gradually changes to a sliding strain at the sides 19'. The two semicylindrical thrust-plates may be made of spring metal, so as to have sufficient resiliency to open out at the sides 19' and break the joint when the device is subjected to heat.

Having thus described my invention, I claim as new and desire to secure by Letters Patent—

1. In an automatic fire-extinguisher, in combination, the nozzle 2, the valve-seat 4, a valve for closing the outlet, a spring bearing on the valve, the thrust-arms 12 bearing on the spring and holding the same in the normal condition, metal to metal, to form a rigid thrust, the thrust-block 15, the thrust-plates 16 secured to the thrust-block by solder, means, substantially as described, for strengthening the solder-joint, the yoke 5, and the screw-threaded thrust-pin 7; the whole adapted to hold the valve to its seat rigidly and permit the solder-joint to yield while the valve is held to its seat, as described.

2. In an automatic fire-extinguisher, the combination with the nozzle 2, the valve-seat 4, the yoke 5, the valve, and the valve-support including the thrust-arms 12 and thrust-plates 16, of the perforated and screw-threaded cone 6, the screw-threaded thrust-pin 7, and the deflector 8 screw-threaded and adapted to lock the thrust-pin in the required position, as described.

3. In an automatic sprinkler, a valve-support for holding the valve closed comprising a thrust-block, a thrust-plate secured thereto by solder and adapted to move laterally when the solder is fused, an inclined arm bearing against said thrust-plate and tending to move the same laterally, and means whereby a lateral movement of the thrust-plate will cause said thrust-plate to be moved transversely away from the thrust-block to rupture the solder-joint, substantially as described.

4. In an automatic sprinkler, a valve-support for holding the valve closed comprising a thrust-block, a thrust-plate secured thereto by solder and adapted to move laterally when the solder is fused, an inclined arm bearing against said thrust-plate and tending to move the same laterally, and means for strengthening the solder-joint and causing the thrust-plate to be moved transversely away from the thrust-block when a lateral movement is given to the thrust-plate, substantially as described.

ROBERT W. NEWTON.

Witnesses:
HENRY J. MILLER,
JOSEPH A. MILLER, Jr.